United States Patent [19]

Nishitani et al.

[11] Patent Number: 5,717,308
[45] Date of Patent: Feb. 10, 1998

[54] ELECTRIC-SUPPLY EQUIPMENT FOR CAMERA

[75] Inventors: Yasuhiro Nishitani; Yoshihiro Fujita, both of Saitama, Japan

[73] Assignee: Fuji Photo Film Co., Ltd., Kanagawa, Japan

[21] Appl. No.: 733,473

[22] Filed: Oct. 18, 1996

[30] Foreign Application Priority Data

Oct. 20, 1995 [JP] Japan ................. 7-273050
Oct. 20, 1995 [JP] Japan ................. 7-273051

[51] Int. Cl.⁶ .................. H02J 7/00; H01M 10/46; G03B 7/26
[52] U.S. Cl. .................. 320/6; 320/15; 320/48; 396/301
[58] Field of Search ................. 320/2, 3, 4, 5, 320/6, 15, 39, 48; 396/301

[56] References Cited

U.S. PATENT DOCUMENTS

| 4,210,854 | 7/1980 | Godard | 320/10 |
| 5,424,800 | 6/1995 | Suzuki | 354/484 |
| 5,568,038 | 10/1996 | Tatsumi | 320/14 |
| 5,610,496 | 3/1997 | Hofbauer et al. | 320/15 X |
| 5,617,002 | 4/1997 | Sakamoto | 320/2 |

FOREIGN PATENT DOCUMENTS 63-91641  4/1988  Japan .

*Primary Examiner*—Peter S. Wong
*Assistant Examiner*—Patrick B. Law
*Attorney, Agent, or Firm*—Young & Thompson

[57] ABSTRACT

In electric-supply equipment of the present invention, a main battery supplies electric power to equipment such as a camera, and an auxiliary battery such as an AA battery is used as a charging power source in order to supply electric energy to the main battery in a charging circuit. Thereby, if the power source (the auxiliary battery) has been consumed, only the auxiliary battery, which is inexpensive and easy to get, is replaced. In particular, a metal lithium secondary battery is used as the main battery, so that the main battery can supply a large amount of high current to the equipment such as a camera. Furthermore, the metal lithium secondary battery spontaneously discharges only a small amount of electricity, so that the battery need not be replaced even after a long period of non-use, and the equipment can be used anytime.

16 Claims, 6 Drawing Sheets

F I G. 3
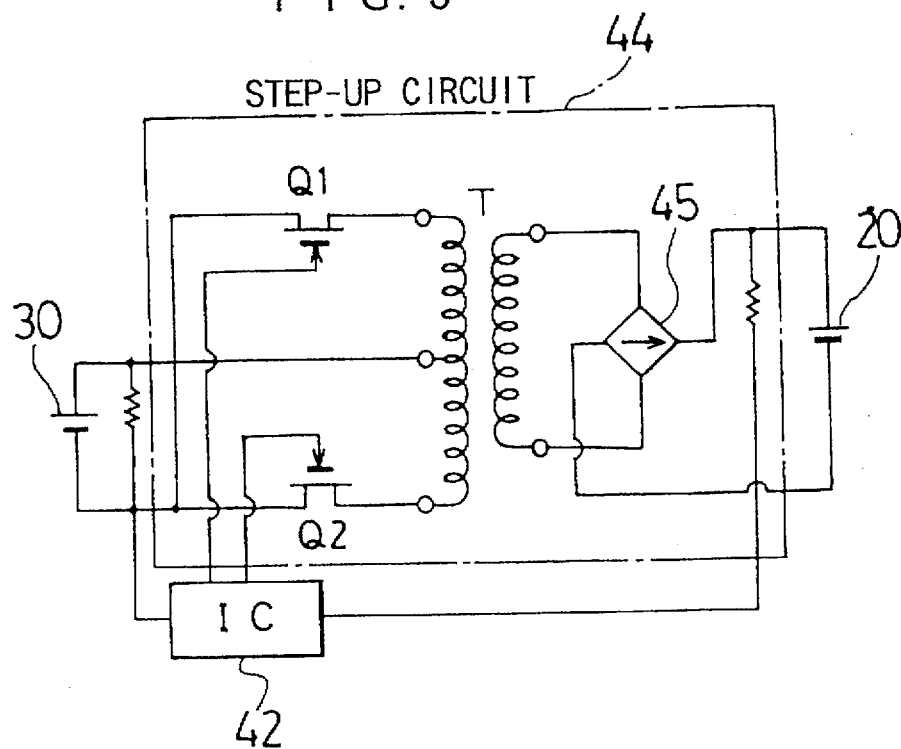
F I G. 4
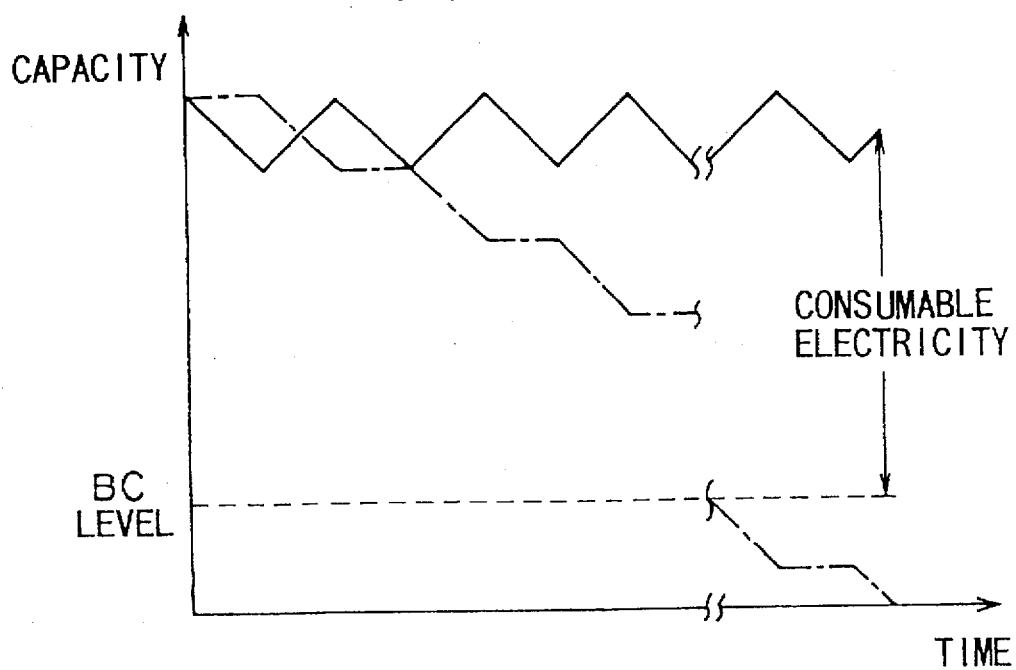

ELECTRIC-SUPPLY EQUIPMENT FOR CAMERA

BACKGROUND OF THE INVENTION

1. Field of the Invention

The present invention relates to electric-supply equipment. More particularly, the present invention pertains to electric-supply equipment which is suitable for supplying electricity to small-sized portable electronic equipment such as a camera.

2. Description of the Related Art

The conventional camera uses a primary battery or a secondary battery as a power source. There is proposed electronic-supply equipment which uses a solar battery as an auxiliary battery to charge a secondary battery built in a camera (Japanese Patent Provisional Publication No. 63-91641).

In the case of the conventional camera which uses the primary battery as a power source, however, if a manganese primary battery is used, a plurality of cells must be used in order to provide a high voltage because the manganese cell has a low voltage. There is another problem in that it takes too long to charge a condenser of an electronic flash because of the large amount of current required. Thus manganese primary battery is not suitable for the recently-developed camera which has a zoom motor, etc. and requires high current. On the other hand, a lithium primary battery is able to provide a high voltage and a large amount of current, but has a disadvantage in that the battery is expensive and can damage the environment when discarded. Furthermore, if the battery has been consumed, the user cannot use the camera until the battery is replaced with a new one, or the user must carry an extra battery. It is sometimes difficult to get the lithium primary battery when traveling overseas, etc.

In the case of the conventional camera which uses a secondary battery as a power source, the charging method is restricted in many ways, and excessive charging and discharging can take place. For this reason, an expensive special charging device is required. In addition, if secondary battery is a nickel-cadmium battery, it will spontaneously discharge a large amount of electricity (a self-discharging rate is between 5% and 10% per month), and its capacity decreases if the battery is not used for a long period of time. For this reason, the battery must be recharged every time its capacity has decreased, and the battery sometimes deteriorates due to the excessive discharging and cannot be used any longer. Moreover, the user cannot use the camera while the secondary battery is being charged, or the user must carry an extra battery.

The electric-supply equipment using the solar battery has a disadvantage in that the solar battery is expensive, and the equipment must be placed under a high luminance. Thus, there is a possibility that the equipment temperature will increase and that the equipment will fail. Further, if the secondary battery is quickly consumed, the camera cannot be used for a long time, because the solar battery generates only a small amount of electricity, and it takes much time to charge the secondary battery.

SUMMARY OF THE INVENTION

It is an object of the present invention to provide electric-supply equipment, in which a large amount of high-voltage high current can be supplied from a main battery to an electricity consuming apparatus, and if a power source has been consumed, only an auxiliary battery, which is inexpensive and easy to get, is replaced with a new one.

It is another object of the present invention to provide electric-supply equipment for a camera, in which even if the auxiliary battery has been consumed, the shooting can be continued for a while without replacing the auxiliary battery.

In order to achieve the above-mentioned objects, electric-supply equipment of the present invention comprises: a rechargeable main battery for supplying electricity to an apparatus connected to the electric-supply equipment; an auxiliary battery housing section in which an auxiliary battery is removably mounted; and a charging means using as a charging power source the auxiliary battery housed in the auxiliary battery housing section so as to charge the main battery. Hence, if the power source has been consumed, only the auxiliary battery (an AA battery for example), which is inexpensive and easy to get, is replaced, and it is more economical and friendlier to the environment when compared to the case where the main battery is replaced. In particular, because a metal lithium secondary battery is used as the main battery, a large amount of high current can be supplied from the main battery to the apparatus and the main battery spontaneously discharges only a small amount of electricity. For this reason, the apparatus can be used even after a long period of non-use.

Moreover, the charging means charges every time the voltage of the main battery has reached a predetermined minimum value or electricity of the main battery has been consumed to a predetermined extent, transferring electric energy from the auxiliary battery to the main battery until the main battery is charged completely. Thereby, the electric energy is supplied from the auxiliary battery to the main battery according to the electricity consumption of the main battery, so that the main battery can be kept charged. Thus, there is no possibility that the excessive discharging will cause the main battery to deteriorate, and the main battery is easy to handle. Moreover, even if the auxiliary battery has been consumed, the main battery still has a charge, so that the apparatus can be used until the main battery is consumed. The apparatus may be used while the auxiliary battery is being replaced.

Furthermore, the electric-supply equipment for a camera according to the present invention comprises: a rechargeable main battery for supplying electricity to electricity consuming means within the camera connected to the electric-supply equipment; an auxiliary battery housing section in which an auxiliary battery is removably mounted; a charging means which charges every time a voltage of the main battery has reached a predetermined minimum value or electricity of the main battery has been consumed to a predetermined extent, transferring electric energy from the auxiliary battery to the main battery until the main battery is charged completely; and a display means for displaying an available amount of electric energy in the auxiliary battery, and after the auxiliary battery is consumed, displaying a number of shots which can be taken by means of available electric energy remaining in the main battery. Hence, the auxiliary battery supplies the main battery with the electric energy according to the electricity consumption in the main battery as is the case in the above-described electric-supply equipment, so that the main battery can be kept charged and there is no possibility that the excessive discharging will cause the main battery to deteriorate. Furthermore, even if the auxiliary battery has been consumed, the main battery still has a charge and the camera can be used until the main battery has been consumed. In particular, the number of shots which can be taken without replacing the auxiliary battery can be confirmed by the display on the display means.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a circuit diagram of an embodiment of a step-up circuit in FIG. 2;

FIG. 4 is a graph showing a state in that electric energy of an auxiliary battery is transferred to a main battery by a charging circuit in FIG. 4;

DETAILED DESCRIPTION OF THE PREFERRED EMBODIMENTS

Figure 1:
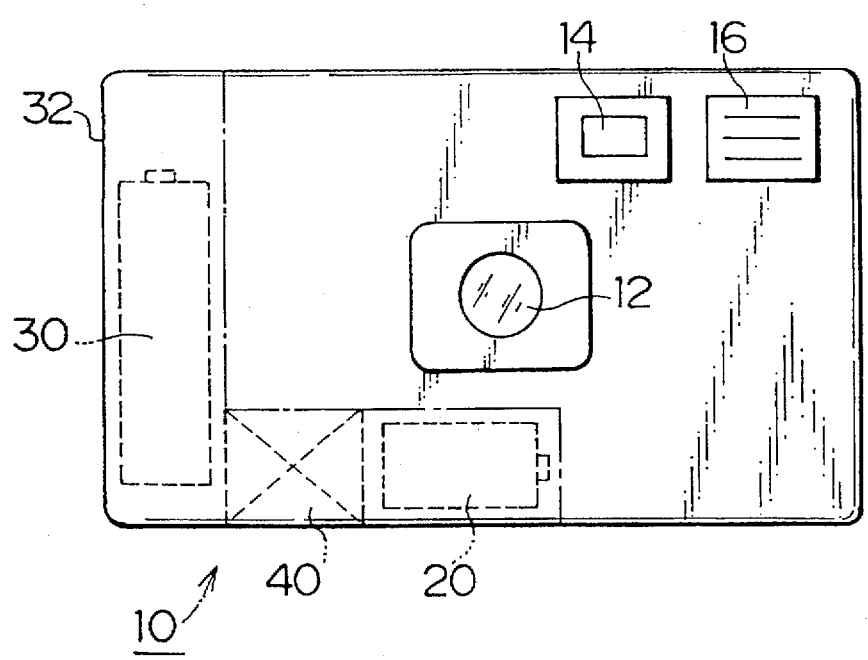
FIG. 1 is a front view including an inner perspective diagram, showing a camera provided with electricity-supply equipment according to the present invention;.

FIG. 1 is a front view of a camera which is provided with electric-supply equipment according to the present invention, including an inner perspective diagram of the camera. In FIG. 1, reference numeral 10 is the electric-supply equipment, 12 is a taking lens, 14 is a finder, and 16 is an electronic flash.

The electric-supply equipment 10 is composed mainly of: a main battery 20; an auxiliary battery housing section 32 in which an auxiliary battery 30 is removably mounted; and a charging circuit 40. The main battery 20 supplies electricity to the electronic flash 16, motors such as a zoom motor and a film feed motor, a camera controlling circuit, etc.

The main battery 20, which is used exclusively for cameras, is rechargeable and hardly discharges spontaneously. For example, the spontaneous discharging rate is less than 5%/yr, and the voltage is 3.2 V if the battery has been charged properly.

A detailed explanation will hereunder be given about the main battery. The positive pole active material of the main battery is preferably composed of manganese dioxide, and more suitably manganese dioxide synthesized by electroextraction or chemically-synthesized manganese dioxide. The negative pole active material is preferably composed of lithium or lithium alloy (any kind of metal which makes the alloy with lithium may be used. Al, Mn, Sn, Mg, Cd and In are preferable. The alloy including Al is the best.)

A conductive agent, a binding agent, a filler, etc. may be added to an electrode mixture. As the conductive agent, any electronic conductive material which does not cause a chemical change in the battery may be used. The additional amount is not particularly restricted; however, it is preferably between 1 wt % and 50 wt %, and more suitably between 2 wt % and 30 wt %.

Examples of the binding agent include: polysaccharide; thermoplastic resin; a sort of polymer having rubber elasticity; and a mixture of them. The additional amount of the binding agent is not particularly restricted; however, it is preferably between 1 wt % and 50 wt %, and more suitably between 2 wt % and 30 wt %.

As the filler, any fibrous material which does not cause a chemical change in the battery may be used. Usually, the fiber such as olefinic polymer such as polypropylene and polyethylene; glass; and carbon is used. The additional amount of the filler is not particularly restricted; however, it is preferably between 0 wt % and 30 wt %.

Nonaqueous electrolyte ordinarily consists of a solvent and lithium salt (anion and lithium cation) soluble in the solvent. The electrolyte is preferably a mixture of propylene carbonate and/or butylene carbonate and 1,2-dimethoxyethane and/or diethyl carbonate, including $LiCF_3SO_3$, $LiClO_4$, $LiBF_4$ and/or $LiPF_6$. The amount of the electrolyte added to the battery is not particularly restricted. The additional amount of the electrolyte depends on the amount of the positive pole active material and the negative pole active material, and the size of the battery.

The volume ratio of the solvent is not particularly restricted; however, in the case of the mixture of propylene carbonate and/or butylene carbonate and 1,2-dimethoxyethane, the ratio is preferably between 0.4:0.6 and 0.6:0.4. The density of supporting electrolyte is not particularly restricted; however, the supporting electrolyte is preferably between 0.2 moles and 0.3 moles per one litter of the electrolyte solution.

The auxiliary battery housing section 32 in FIG. 1 is formed in such a manner as to house one AA battery for example. An AA dry battery as the auxiliary battery 30 is housed in the auxiliary battery housing section 32. Another battery (a secondary battery) having the same shape as the AA battery may be used as the auxiliary battery.

Figure 2:
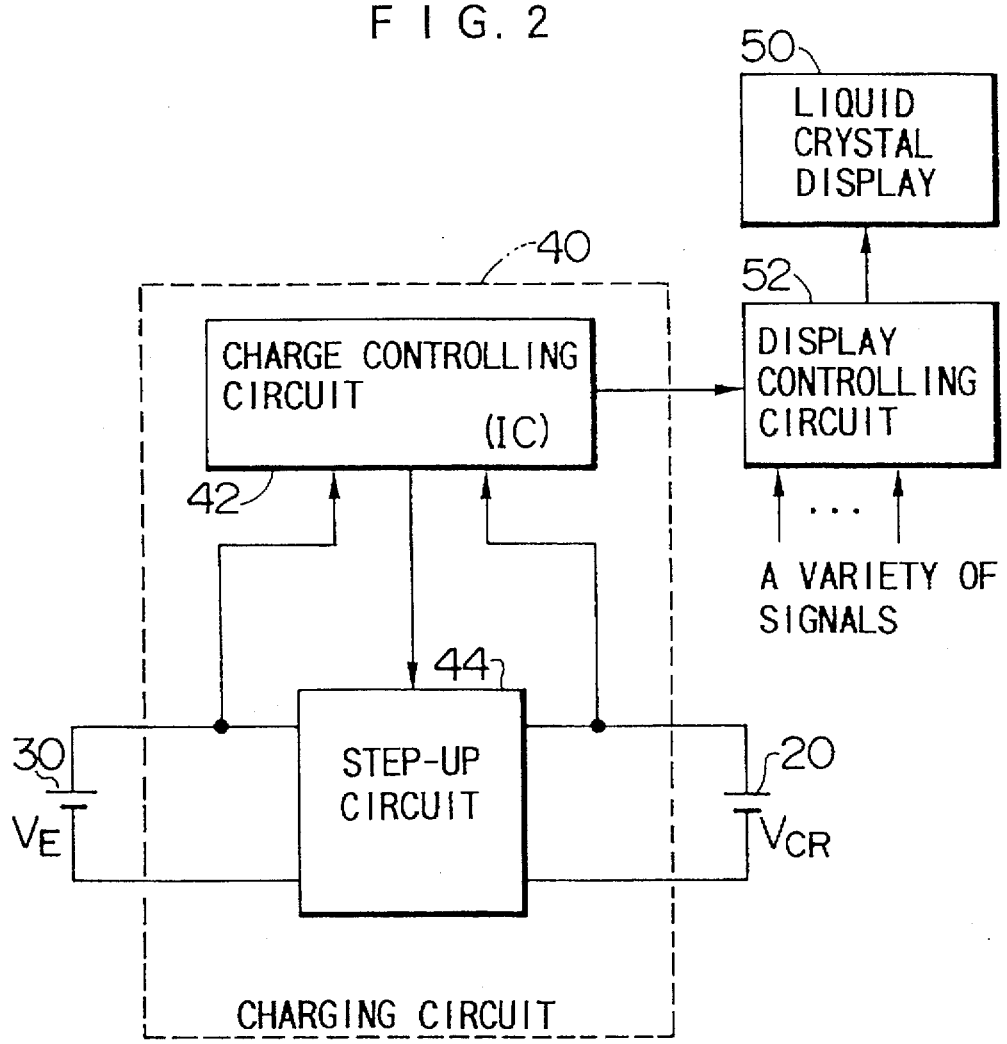
FIG. 2 is a block diagram of an embodiment of the electricity-supply equipment according to the present invention.

The charging circuit 40 consists of a charge controlling circuit 42 and a step-up circuit 44 as shown in FIG. 2. The charge controlling circuit 42 measures the voltage $V_{CR}$ of the main battery 20 and the voltage $V_E$ of the auxiliary battery 30. For example, if the voltage $V_{CR}$ of the main battery 20 is lower than 3.0 V, and the voltage $V_E$ of the auxiliary battery 30 is 0.9 V (the final voltage of the auxiliary battery 30) or higher, the charge controlling circuit 42 activates the step-up circuit 44 to charge the main battery 20.

On the other hand, if the main battery 20 has been charged completely (the voltage $V_{CR}$ reaches 3.2 V), or if the auxiliary battery 30 has been consumed to such an extent that the voltage $V_E$ is lower than 0.9 V, the charge controlling circuit 42 stops the step-up circuit 44. Further, in order to display an available amount of electric energy in the auxiliary battery 30 on a liquid crystal display (LCD) 50, the charge controlling circuit 42 outputs a signal representing the voltage of the auxiliary battery 30 to a display controlling circuit 52 in the camera. A detailed description will be given later about the display on the LCD 50. The charge controlling circuit 42 is supplied with the driving power by the main battery 20.

Next, the step-up circuit 44 will be explained. FIG. 3 is a circuit diagram of an embodiment of the step-up circuit 44. As shown in FIG. 3, the step-up circuit 44 is of a push-pull type, and converts direct current supplied by the auxiliary battery 30 into alternating current by means of transistors Q1 and Q2 which are turned on interchangeably by the charge controlling circuit 42. The step-up circuit 44 steps up the voltage with a transformer T, and then rectifies the current by a rectifier 45, thereby converting the direct current supplied by the auxiliary battery 30 into direct current which is required for charging the main battery 20.

The voltage $V_1$ at the primary side of the transformer T and the voltage $V_2$ at the secondary side have a relation as $$V_1/V_2 = n_1/n_2, \qquad (1)$$

where $n_1$ and $n_2$ are the number of turns at the primary and secondary sides of the transformer T, respectively. On the other hand, the minimum voltage $V_1$ at the primary side of the transformer T is $$V_1 = 0.9 - V_{DS} = 0.7 [V], \qquad (2)$$

where 0.9 is the final voltage of the auxiliary battery 30, and $V_{DS}$ is the saturation voltage between the drain and the source of the transistors Q1 and Q2. The voltage $V_2$ which is required at the secondary side of the transformer T is $$V_2 = 3.2 + 0.7 \times 2 + 0.5 = 5.1 [V], \qquad (3)$$

where 3.2 is the maximum voltage of the main battery 20, and 0.7×2 is a voltage drop in the rectifier 45. Accordingly, the ratio of the number of turns $n_2/n_1$ is $$n_2/n_1 = V_2/V_1 \approx 7.3. \qquad (4)$$

As stated above, every time the voltage $V_{CR}$ of the main battery 20 reaches 3.0 V, the charge controlling circuit 40 transfers the electric energy of the auxiliary battery 30 to the main battery 20, and charges the main battery 20. If the main battery 20 has been charged completely (the voltage $V_{CR}$ has reached 3.2 V), the charge controlling circuit 40 stops the charging.

FIG. 4 is a graph showing the state in that the electric energy of the auxiliary battery 30 is transferred to the main battery 20. The solid line shows the capacity of the main battery 20, and the dot-dash lines show the capacity of the auxiliary battery 30.

As shown in the graph, the capacity of the completely-charged main battery 20 is substantially equal to the capacity of the newly-provided auxiliary battery 30. If the camera is used, the capacity of the main battery 20 decreases gradually. If the voltage $V_{CR}$ of the main battery 20 has reached 3.0 V, the electric energy of the auxiliary battery 30 is transferred to the main battery 20. Accordingly, the capacity of the main battery 20 increases whereas the capacity of the auxiliary battery 30 decreases.

The electric energy of the auxiliary battery 30 is transferred to the main battery 20, depending on the consumption of the electricity in the main battery 20, so that the main battery 20 can be maintained in such a state that the voltage is higher than 3.0 V. For this reason, there is no possibility that the main battery 20 will deteriorate due to excessive discharge, and the main battery can be easily handled. Moreover, the main battery 20, which is the lithium battery, is able to supply the higher voltage and current to the camera compared to the auxiliary battery 30. Thus, the main battery 20 is suitable for a camera which requires a high current, and the charging time of a condenser for the electronic flash can be reduced.

If the electric energy of the auxiliary battery 30 has been transferred to the main battery 20, and the capacity of the auxiliary battery 30 has reached almost 0 as shown in FIG. 4 (if the voltage of the auxiliary battery 30 reaches the final voltage 0.9 V), the electric energy is no longer supplied to the main battery 20 by the auxiliary battery 30. The main battery 20 is however maintained in such a state that the voltage $V_{CR}$ is 3.0 V or higher and 3.2 V or lower. That is, the main battery 20 has some consumable electricity, for example, the electricity which enables 100 shots from the camera until the voltage $V_{CR}$ reaches a predetermined battery check level (BC level in FIG. 4). Thus, the camera can be continuously used even if the auxiliary battery 30 is not immediately replaced with a new one.

Further, if the auxiliary battery 30 is replaced, the size AA battery, which is inexpensive and easy to get anywhere in the world, may be used as the auxiliary battery 30. Furthermore, the AA battery which is used in other equipment may also be used to some extent.

In the above-described embodiment, if the voltage $V_{CR}$ has reached 3.0 V, the electric energy of the auxiliary battery 30 is transferred to the main battery 20; however, the present invention is not restricted to this. If the number of shots has reached a predetermined one (for example 100 shots), the electric energy of the auxiliary battery 30 may also be transferred to the main battery 20. In this case, the charge controlling circuit 42 need to receive a signal representing the number of shots from the camera.

Next, an explanation will be given about the LCD 50 in FIG. 2 and the display controlling circuit 52.

As mentioned previously, the display controlling circuit 52 receives the signal representing the voltage of the auxiliary battery 30 from the charge controlling circuit 42. The display controlling circuit 52 also receives signals from a film counter for counting the available frames of the film, an electronic flash switch, a shutter button, and a self-timer switch. The display controlling circuit 52 displays the required information on the LCD 50 in accordance with the signals.

That is, the display controlling circuit 52 makes the LCD 50 display the available amount of electric energy in the auxiliary battery 30 according to the signal representing the voltage of the auxiliary battery 30, which signal is sent from the charge controlling circuit 42.

Figure 5A:
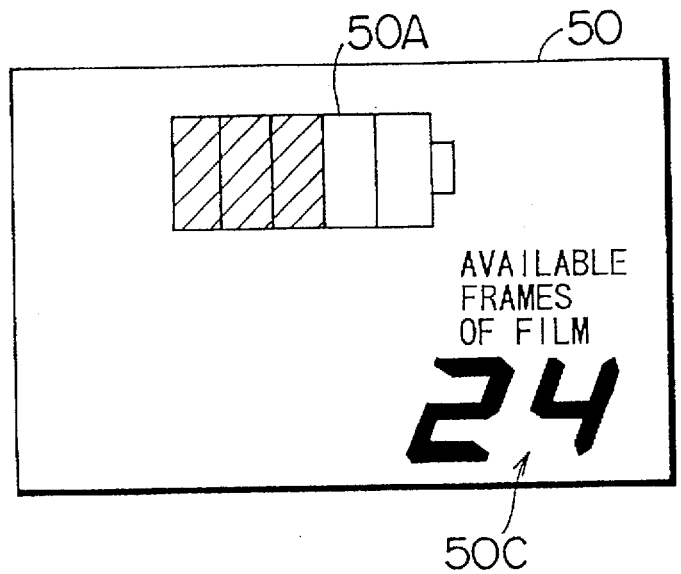
FIGS. 5 (A) and 5 (B) are plan views showing the display on a liquid crystal display in FIG. 2.
Figure 5B:
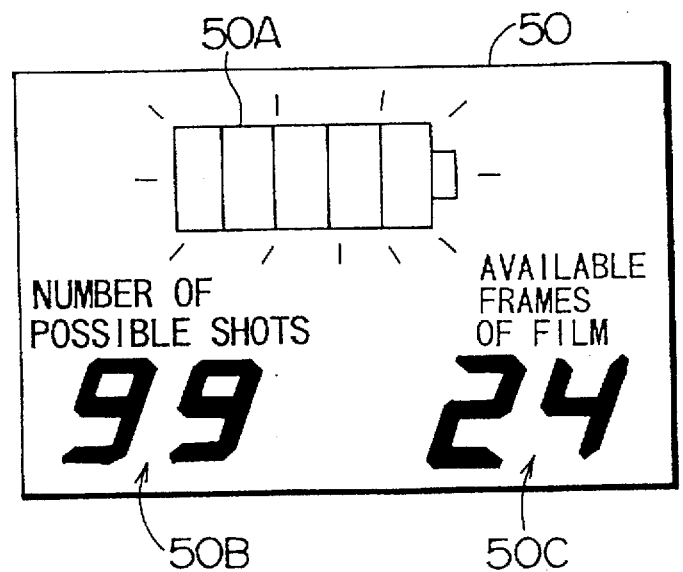

FIGS. 5 (A) and (B) are plan views showing one example of the display on the LCD 50. FIG. 5 (A) shows that there is some available electric energy in the auxiliary battery 30, and FIG. 5 (B) shows that there is no available electric energy in the auxiliary battery 30. If there is some available electric energy in the auxiliary battery 30, the available amount of electric energy in the auxiliary battery 30 is graphically displayed on a display section 50A of the LCD 50 as shown in FIG. 5 (A). If there is no available electric energy in the auxiliary battery 30, as shown in FIG. 5 (B), the display section 50A is blinked to indicate that the battery should be replaced, and then the number of shots, which can be taken without replacing the battery, is displayed on the display section 50B.

That is, as has been explained with reference to FIG. 4, even if the auxiliary battery 30 has been consumed, the main battery 20 has some consumable electricity (for example the electricity enabling photographing of 100 shots). Thus, if the auxiliary battery 30 has been consumed, the number of possible shots "99" is displayed on the display section 50B as shown in FIG. 5 (B), and the number of possible shots is displayed beginning from 99 down to 1 every time one shot is taken.

The available frames of the film is displayed on a display section 50C of the LCD 50 in order to prevent the number of possible shots from being confused with the available frames of the film. Moreover, although not shown in FIG. 5, other necessary information relating to the flash light photography, the self-photography, etc. is also displayed on the LCD 50.

The method of displaying the number of possible shots is not restricted to the above embodiment. For instance, the number of possible shots may be displayed according to the measured voltage of the main battery 20. The number of possible shots may also be displayed graphically so that the rough number can be recognized.

Next, an explanation will be given about another example of the arrangement and the method of replacing the battery in the camera provided with the camera electric-supply equipment according to the present invention.

Figure 6:
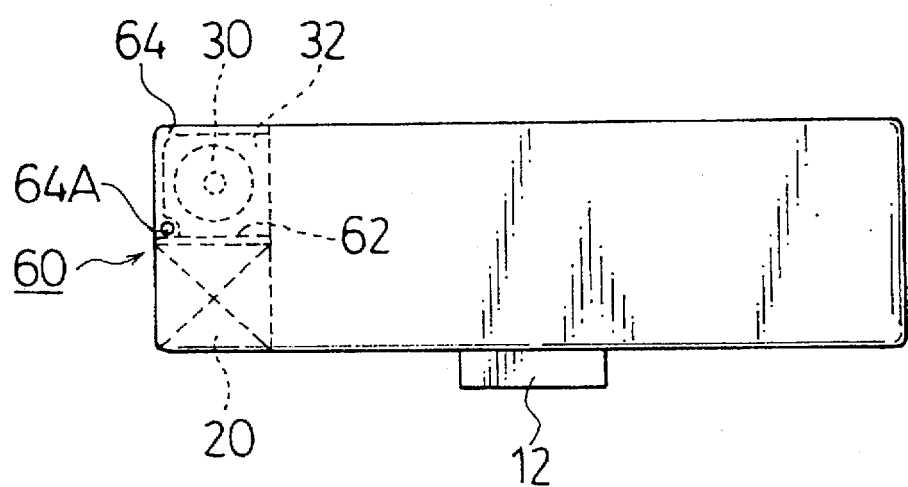
FIG. 6 is a top view of a camera provided with electric-supply equipment according to the present invention, including an inner perspective diagram of the camera.
Figure 7:
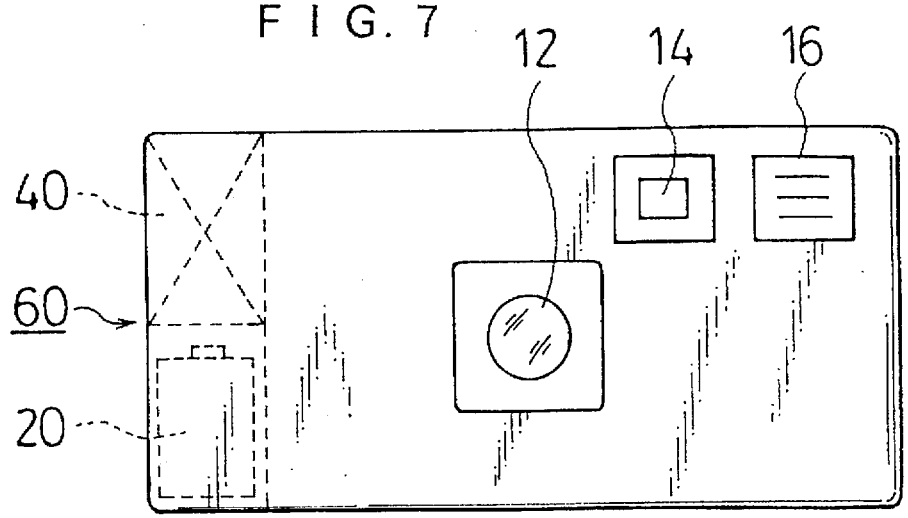
FIG. 7 is a front view of a camera in FIG. 6, including an inner perspective diagram of the camera.

FIGS. 6 and 7 are top view and front view, respectively, showing the camera provided with the electric-supply equipment according to the present invention, including an inner perspective diagram of the camera. Parts similar to those previously described with reference to FIG. 1 are denoted by the same reference numerals, and they will not be explained.

If the electric-supply equipment 10 in FIG. 1 is compared with an electric-supply equipment 60 in FIGS. 6 and 7, the former is substantially L-shaped and arranged in the camera, and the latter is small-sized and rectangular-parallelepiped and arranged at the side of the camera. That is, the electric-supply equipment 60 is divided into two sections by a partition 62 as shown in FIG. 6. The auxiliary battery housing section 32, in which the auxiliary battery 30 is removably mounted, is formed in one section of the electric-supply equipment 60, and the charging circuit 40 is arranged in the upper portion of the other section, and the main battery 20 is arranged in the lower portion (see FIG. 7).

An openable battery cover 64 is provided on a hinge 64A at the auxiliary battery housing section 32. The auxiliary battery 30 can be easily replaced by opening the battery cover 64.

On the other hand, the main battery 20 need not be replaced, and the user cannot take out the main battery 20 or cannot easily take it out. That is, in order to replace the main battery 20, the user must open the battery cover 64 and remove the partition 62. However, the partition 62 cannot be removed without a special tool.

For this reason, without becoming aware that the camera uses the storage battery, the user determines that the camera can be driven by one AA battery (the auxiliary battery 30). The camera of the above type can save the cost because the battery need not be replaced from the beginning to about 600 shots, thereafter the AA battery is replaced only about five times until 2000 shots are taken. Furthermore, the lithium battery (the main battery 20) is less expensive and spontaneously discharges less electricity than an ordinary secondary battery. Thus, the lithium battery has an advantage in that it can be used anytime even after a long period of non-use.

Figure 8:
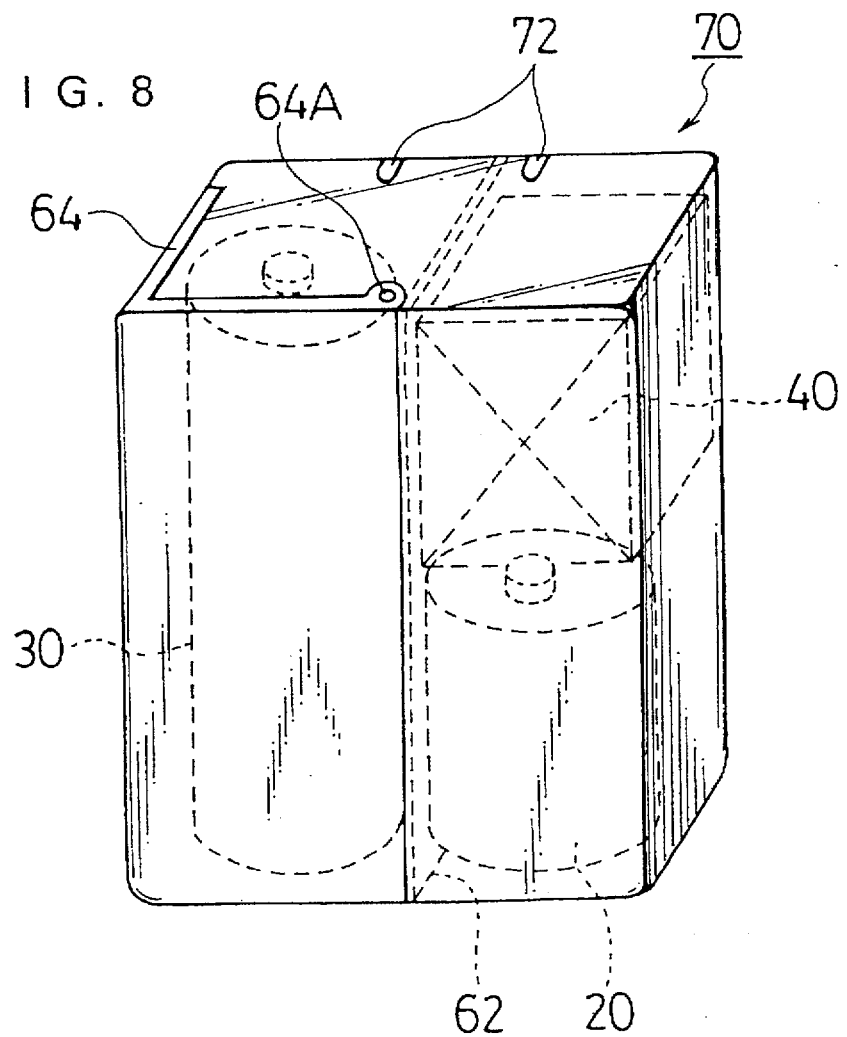
FIG. 8 is a perspective view showing another embodiment of electric-supply equipment according to the present invention.

FIG. 8 is a perspective view showing another embodiment of the electric-supply equipment according to the present invention. Parts similar to those previously described with reference to FIGS. 6 and 7 are denoted by the same reference numerals, and they will not be explained in detail.

If the electric-supply equipment 60 in FIGS. 6 and 7 is compared with electric-supply equipment 70 in FIG. 8, the former is incorporated with the camera, and the latter is constructed as an independent battery pack. A power output terminals 72 are provided at the outer case of the electricity-supply equipment 70 so as to connect to the apparatus for which the electricity-supply equipment 70 is used.

The electric-supply battery 70 is built in the battery housing section of the camera or attached to the outside of the camera. The electric-supply equipment 70 may be used as a battery pack for a cellular phone, a video camera, etc. as well as a camera.

The arrangement of the electric-supply equipment is not restricted to the above embodiments. The charging circuit may be mounted on a circuit board in the electricity consuming apparatus. In the above embodiment, one main battery and one auxiliary battery are provided in the electric-supply equipment; however, the number of the batteries is not restricted to this. The LCD and the display controlling circuit are not always provided in the electricity consuming apparatus, and they may be provided in the electric-supply equipment.

As set forth hereinabove, according to the electric-supply equipment of the present invention, the main battery supplies the electricity consuming apparatus with the electricity, and the main battery is charged by the auxiliary battery such as the AA battery. For this reason, if the power source (the auxiliary battery) has been consumed, only the auxiliary battery, which is inexpensive and easy to get, is replaced. Compared with the case in which the main battery is replaced, it is more economical and friendlier to the environment. In particular, if the metal lithium secondary battery is used as the main battery, a large amount of high current can be supplied to the electricity consuming apparatus by the main battery, and the main battery spontaneously discharges little electricity. Thus, the electricity consuming apparatus can be used even after a long period of non-use.

The auxiliary battery supplies the main battery with the electric energy according to the consumption of the electricity in the main battery, so that the main battery can be kept charged. Thus, there is no possibility that the excessive discharging deteriorates the battery. Furthermore, even if the auxiliary battery has been consumed, the main battery is kept charged and the electricity consuming apparatus can be used until the main battery has been consumed. In particular, the available amount of electric energy in the auxiliary battery can be recognized by means of the display on the display means, and if the auxiliary battery has been consumed, the user can know the number of shots which can be taken without replacing the auxiliary battery.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. Electric-supply equipment comprising:
    a rechargeable main battery for supplying electricity to an apparatus connected to said electric-supply equipment;
    an auxiliary battery housing section in which an auxiliary battery is removably mounted;
    charging means using as a charging power source said auxiliary battery housed in said auxiliary battery housing section so as to charge said main battery; and
    display means for displaying an available amount of electrical energy available in said auxiliary battery and for displaying an available amount of electrical energy in said main battery when said auxiliary battery is consumed.

2. The electric-supply equipment as defined in claim 1, wherein said main battery is a metal lithium secondary battery.

3. The electric-supply equipment as defined in claim 1, wherein said auxiliary battery is a manganese primary battery.

4. The electric-supply equipment as defined in claim 1, wherein said charging means charges said main battery every time a voltage of said main battery has reached a predetermined minimum value by transferring electric energy from said auxiliary battery to said main battery until said main battery is charged completely.

5. The electric-supply equipment as defined in claim 1, further comprising power output terminals for connecting to said apparatus.

6. The electric-supply equipment as defined in claim 1, wherein said apparatus is a camera in which there are arranged said main battery, said auxiliary battery housing section, said display means and said charging means.

7. Electric-supply equipment for a camera comprising:

a rechargeable main battery for supplying electricity to electricity consuming means within said camera;

an auxiliary battery housing section in which an auxiliary battery is removably mounted;

charging means for charging said main battery when a voltage of said main battery has reached a predetermined minimum value by transferring electric energy from said auxiliary battery to said main battery until said main battery is charged completely; and display means for displaying an available amount of electric energy in said auxiliary battery, and after said auxiliary battery is consumed, displaying a number of shots which can be taken with the electric energy in said main battery.

8. The electric-supply equipment as defined in claim 7, wherein said main battery is a metal lithium secondary battery.

9. The electric-supply equipment as defined in claim 7, wherein said auxiliary battery is a manganese primary battery.

10. The electric-supply equipment as defined in claim 7, wherein said display means displays a maximum number of shots taken by means of available electric energy in said main battery just after said auxiliary battery is consumed, and then displays number of possible shots which is decreased one by one beginning from said maximum number of shots every time one shot is taken.

11. The electric-supply equipment as defined in claim 7, wherein after said auxiliary battery is consumed, said display means measures a voltage of said main battery, and displays said number of shots according to the measured voltage.

12. A camera comprising:

a rechargeable main battery for supplying electricity to the camera, said main battery having a low self-discharging rate;

an auxiliary battery having a low self-discharging rate detachably housed in an auxiliary batter housing; and a charging means for charging said main battery using as a charging power source said auxiliary battery.

13. The camera as defined in claim 12, wherein said auxiliary battery is a primary battery which is not rechargeable.

14. The camera as defined in claim 12, further comprising a step-up circuit for stepping up voltage supplied from said auxiliary battery.

15. The camera as defined claim 14, wherein said auxiliary battery has a lower voltage than a minimum voltage for driving the camera.

16. The camera as defined claim 12, wherein said main battery is housed in the camera such that said main battery cannot be removed by a user.

* * * * *